Sept. 26, 1944.   W. S. WOLFRAM   2,359,184
CLUTCH
Filed May 29, 1942   2 Sheets-Sheet 1

Inventor
William S. Wolfram
By Blackmore, Spencer & Flint
Attorneys

Sept. 26, 1944.  W. S. WOLFRAM  2,359,184
CLUTCH
Filed May 29, 1942   2 Sheets-Sheet 2

Inventor
William S. Wolfram
By Blackmore, Spencer & Hunt
Attorneys

Patented Sept. 26, 1944

2,359,184

UNITED STATES PATENT OFFICE 2,359,184

CLUTCH

William S. Wolfram, Scotch Plains, N. J., assignor to General Motors Corporation, Detroit, Mich., a corporation of Delaware Application May 29, 1942, Serial No. 445,035

2 Claims. (Cl. 192—68)

This invention relates to friction clutches, such as are used on motor vehicles to couple the engine and transmission shafts.

It is an object of this invention to overcome chatter, resulting from an irregular clutch engaging action.

Among other objects are the accomplishment of the major object by means which shall be effective and yet simple and inexpensive.

On the drawings which show several embodiments:

Prior to the present invention efforts have been made to improve the engagement of the friction members of vehicle clutches. These efforts have frequently involved modifications of the driven plate, such as the formation of tongues in that part of the driven plate between its facings and normally bent from the plane of the plate so that they offer resilient resistance as they are forced into the plane of the plate as the clutch members come into engagement under the influence of the clutch engaging spring.

The present invention has a somewhat similar object. Its several forms have in common the use of the clutch cover to provide the resilient cushioning action.

Figure 1:
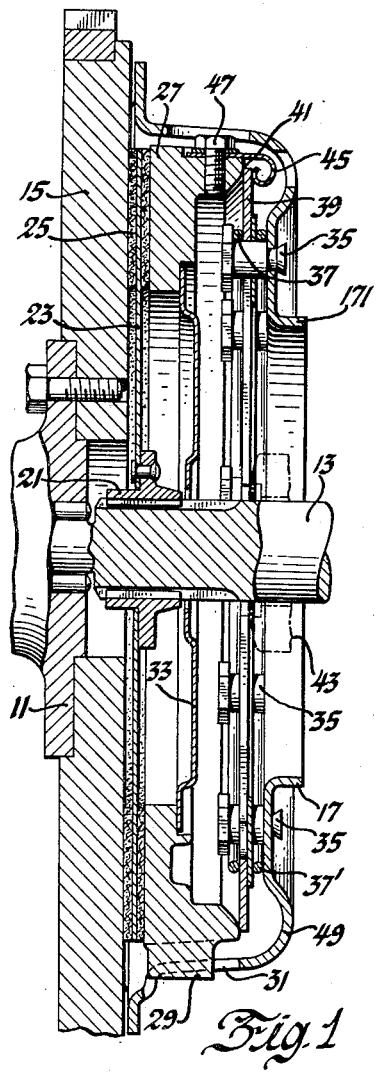
Fig. 1 is a transverse section, the section being marked on Fig. 2 by line 1—1.
Figure 2:
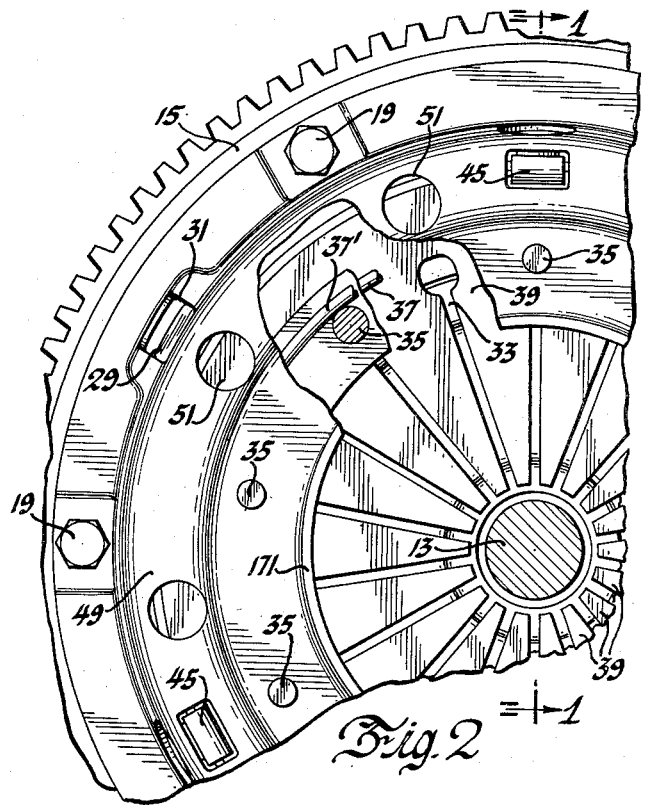
Fig. 2 is a view of this form in elevation.

On Fig. 1 is shown an engine shaft 11 and transmission shaft 13. The engine shaft carries the flywheel 15. To house the friction members is a cover 17. It is secured to the flywheel at 19.

Within the cover will be seen the driven plate having a hub 21 slidably splined on shaft 13. The hub carries a plate 23 with friction facings 25. A pressure plate 27 is arranged with radially extending lugs 29 projecting through axially elongated openings 31 in the cover. It may slide axially and when moved forward to grip the driven plate it may transmit thereto the rotation of the flywheel and cover since, because of lugs 29, it must rotate with the cover. At 33 is a baffle to keep oil from the facings.

The cover supports a circular series of pins 35 upon which are rings 37, 37' between which rings is the radially slotted bowed clutch engaging spring 39, the spring having openings to receive the pins. Spring 39 is stressed in assembly so that its marginal region 41 presses the pressure plate forwardly to clutch engaging position and ring 37' takes the reaction, transmitting it to the cover. To release the clutch some suitable throwout means such as a collar 43 is pushed forward upon the central part of the spring. This takes the load from ring 37'. The spring fulcrums as it were about ring 37. The load on the pressure plate is relieved and as the marginal portion of the spring moves to the right (Fig. 1) suitable expedients such as fingers 45 secured at 47 to the pressure plate and overlying the edge of the spring positively move the pressure plate to inoperative position.

As has been stated above, expedients have been adopted to offer resilient resistance to the movement of the pressure plate under the influence of springs such as spring 39. In the embodiments herein shown the cover plate is used to furnish the resilient action. As the clutch reengages after release the reaction at ring 37' and the cover corresponds to the increasing pressure on the flywheel. The inventive idea consists in constructing the cover to yield under the influence of the reaction and thus retard the active force at 41.

In Fig. 1 it will be seen that the cover is of that kind having a circular bowed region at 49. In this region 49 there are provided a series of openings 51 which render the cover somewhat resilient, sufficiently resilient so that, as the spring 39 presses plate 27, the reaction at 37' is resisted not by a rigid cover but a cover which yields to some extent and thereby smooths out the clutch engaging action. Of course it is self-evident that with my invention there may be used any of the known forms of axially cushioning driven plate structures but it is believed that my resilient cover may be sufficient to afford the smooth clutch engagement without resort to these older expedients.

Figure 3:
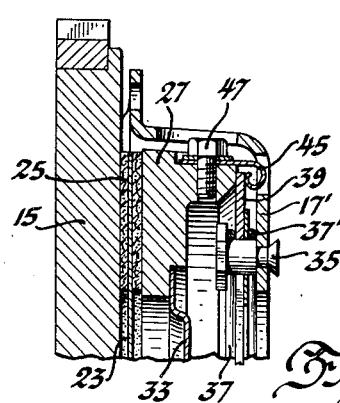
Fig. 3 is a partial section of a second form, the section being on line 3—3 of Fig. 4.
Figure 4:
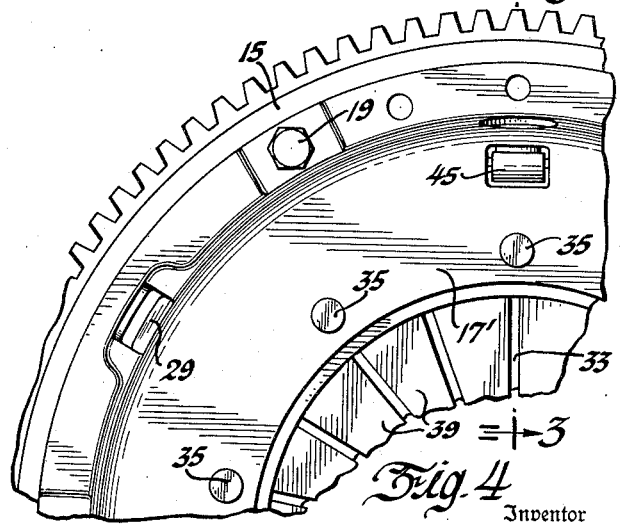
Fig. 4 is a view in elevation of this second form.

In Figs. 3 and 4 is shown a very simple structure of cover which may be used to carry out the object of the invention. In this form cover 17' is used instead of cover 17. The other parts of the clutch may be the same and need not be described. This cover lacks the bowed region 49 of cover 17, being flat in the region where cover 17 was bowed. Also it will be seen that the axial flange 171 of cover 17 is omitted. The omission of the bowed region and the axial flange will, it is believed, enable this cover with its flat rear face to afford the resiliency necessary to get the smooth clutch engagement.

Figure 5:
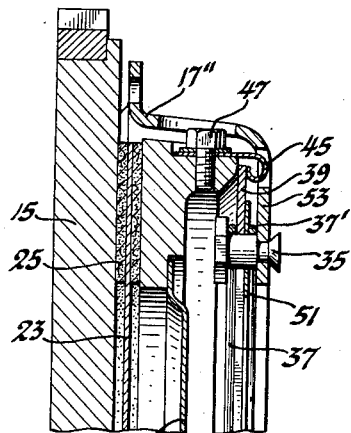
Fig. 5 and Fig. 6 are views in section and elevation respectively of a third form.
Figure 6:
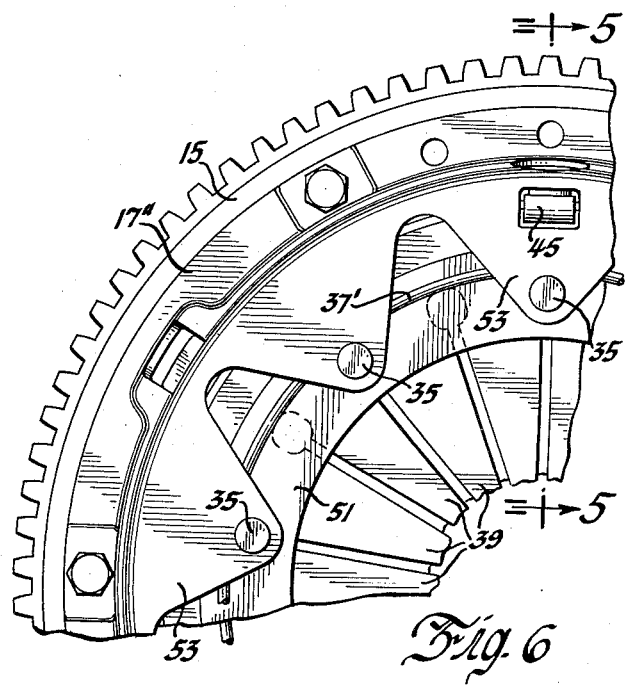

In Figs. 5 and 6 the parts of the clutch except for the cover are the same as in Fig. 1 and they have been given the same reference characters. The cover of Fig. 5 is marked 17''. It has, as in the other figures, an annular ring portion between the rear face and the attaching flange. Its rear face, the spring abutment wall, is changed. Deep tapered scallop-shaped formations 51 extend radially outward from the innermost part of the cover. These formations leave triangular tongues 53 with apices directed to the clutch center. These tongues 53 carry the ring supporting pins 35. The tongues 53 yield in the region between the radially outward wider region and their inner apices which carry the pins and thus furnish the axial cushioning.

Figure 7:
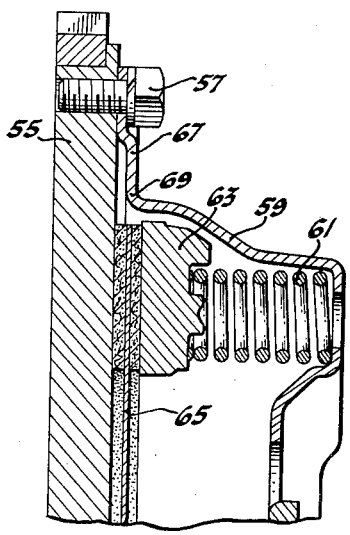
Figs. 7 and 8 are views in section and elevation respectively of a fourth form.
Figure 8:
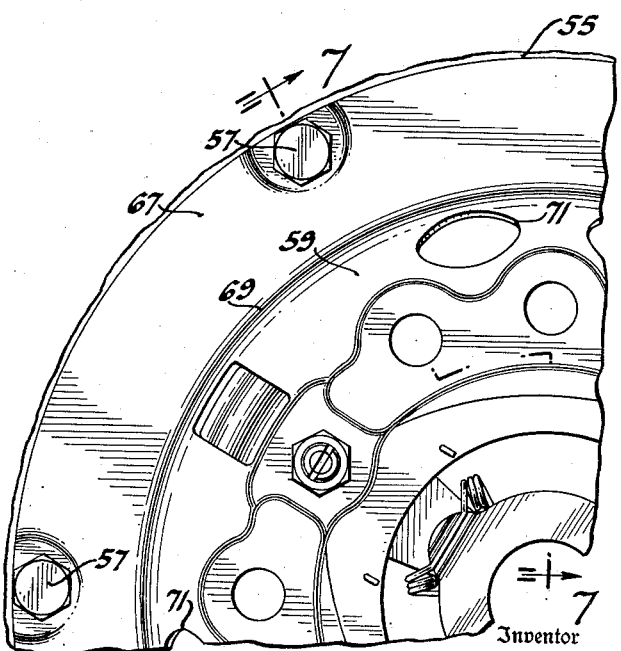

In Figures 7 and 8 the inventive idea is shown associated with a somewhat different form of clutch. This clutch has a flywheel 55 to which is secured at 57 a cover 59. Within the cover springs such as 61 press the pressure plate 63 toward the flywheel to grip the usual driven plate 65. Any convenient throwout means may be used to overcome springs 61 and withdraw the pressure plate. This is no part of the invention and need not be described. The cover has a relatively wide flange 67 and the attaching means are at its outer margin with the result that the annulus outwardly of the circular junction at 69 between flange 67 and the annular ring portion may yield and offer resistance to clutch engagement under the influence of spring 61. The resiliency of course quickly builds up so that spring 61 acts as if against a rigid cover.

Although shown with a clutch having coil springs it will be appreciated that the same form of cover cushioning may be used with the now popular bowed spring shown by Fig. 1, while perhaps not necessary additional cover yieldability may be provided by apertures 71.

I claim:

1. In a clutch having frictionally engaging members, spring means to press said members together, a clutch cover in the form of a peripheral circular wall attached to one of said members and with a circular series of triangular formations having bases integral with said circular wall and with inwardly directed apices, said apices determining an inner circle concentric with said circular wall and abutment means for said spring means carried by said apices.

2. In a clutch having frictionally engaging members, spring means to press said members together, a clutch cover having a wall in the form of a circular series of triangular formations with their apices toward the center, means on and adjacent the apices of said formations to take the reaction of said spring means, said spring means being a bowed disc and said last named means comprising a plurality of pins and a ring supported thereby between said formations and the bowed disc.

WILLIAM S. WOLFRAM.